United States Patent
Feygin et al.

(10) Patent No.: US 8,403,674 B2
(45) Date of Patent: Mar. 26, 2013

(54) VASCULAR-ACCESS SIMULATION SYSTEM WITH ERGONOMIC FEATURES

(75) Inventors: David Feygin, Washington, DC (US); Chih-Hao Ho, Reston, VA (US)

(73) Assignee: Laerdal Medical AS (NO)

( * ) Notice: Subject to any disclaimer, the term of this patent is extended or adjusted under 35 U.S.C. 154(b) by 2247 days.

(21) Appl. No.: 10/807,016

(22) Filed: Mar. 23, 2004

(65) Prior Publication Data

US 2005/0214724 A1 Sep. 29, 2005

(51) Int. Cl.
*G09B 23/28* (2006.01)
(52) U.S. Cl. .......................................................... 434/262
(58) Field of Classification Search .................... 434/262
See application file for complete search history.

(56) References Cited

U.S. PATENT DOCUMENTS

| | | | |
|---|---|---|---|
| 3,704,529 A * | 12/1972 | Cioppa .......................... 434/272 |
| 3,722,108 A | 3/1973 | Chase |
| 4,134,218 A * | 1/1979 | Adams et al. .................. 434/267 |
| 4,850,960 A | 7/1989 | Grayzel |
| 5,472,345 A * | 12/1995 | Eggert .......................... 434/273 |
| 5,821,920 A | 10/1998 | Rosenberg et al. |
| 5,853,292 A * | 12/1998 | Eggert et al. .................. 434/262 |
| 6,038,488 A | 3/2000 | Barnes et al. |
| 6,088,020 A | 7/2000 | Mor |
| 6,223,100 B1 * | 4/2001 | Green ........................... 700/264 |
| 6,398,557 B1 * | 6/2002 | Hoballah ....................... 434/272 |
| 6,443,735 B1 | 9/2002 | Eggert et al. |
| 6,470,302 B1 | 10/2002 | Cunningham et al. |
| 6,527,558 B1 * | 3/2003 | Eggert et al. .................. 434/262 |
| 6,538,634 B1 | 3/2003 | Chui et al. |
| 6,568,941 B1 | 5/2003 | Goldstein |
| 6,654,000 B2 * | 11/2003 | Rosenberg .................... 345/156 |
| 6,773,263 B2 * | 8/2004 | Nicholls et al. ............... 434/267 |
| 6,929,481 B1 * | 8/2005 | Alexander et al. ............ 434/262 |
| 7,182,602 B2 * | 2/2007 | Lakin et al. ................... 434/262 |
| 2002/0168618 A1 * | 11/2002 | Anderson et al. ............. 434/262 |
| 2003/0031993 A1 * | 2/2003 | Pugh ............................. 434/262 |
| 2003/0068607 A1 * | 4/2003 | Gregorio et al. .............. 434/262 |
| 2003/0069719 A1 | 4/2003 | Cunningham et al. |
| 2003/0073060 A1 * | 4/2003 | Eggert et al. .................. 434/262 |
| 2003/0144691 A1 * | 7/2003 | Lambroza ..................... 606/202 |
| 2003/0210259 A1 | 11/2003 | Liu et al. |
| 2004/0002045 A1 | 1/2004 | Wellman et al. |
| 2004/0024418 A1 | 2/2004 | Irion et al. |
| 2004/0030303 A1 | 2/2004 | Prais et al. |
| 2004/0076940 A1 * | 4/2004 | Alexander et al. ............ 434/262 |
| 2004/0097806 A1 | 5/2004 | Hunter et al. |
| 2004/0126746 A1 * | 7/2004 | Toly ............................. 434/262 |
| 2004/0157199 A1 * | 8/2004 | Eggert et al. .................. 434/262 |

FOREIGN PATENT DOCUMENTS

WO 03/096307 A1 11/2003

* cited by examiner

*Primary Examiner* — Kesha Y. Frisby
(74) *Attorney, Agent, or Firm* — Kaplan Breyer Schwarz & Ottesen, LLP (57) ABSTRACT

The illustrative embodiment is a simulation system for practicing vascular-access procedures without using human subjects. The simulator includes a data-processing system and a haptics interface device. The haptics device provides the physical interface at which a user interacts with various mechanisms that are intended to enable the user to simulate various aspects of a vascular-access procedure. The haptics device is designed so that its physical form and manner of use are not inconsistent with the experience of performing an actual vascular access procedure.

26 Claims, 5 Drawing Sheets

VASCULAR-ACCESS SIMULATION SYSTEM WITH ERGONOMIC FEATURES

STATEMENT OF RELATED CASES

This case is related to U.S. patent application Ser. No. 10/807,017, Ser. No. 10/807,047, Ser. No. 10/806,531, and Ser. No. 10/887,348, all of which are incorporated by reference herein.

FIELD OF THE INVENTION

The present invention relates generally to systems that simulate medical procedures for the purposes of training or accreditation. More particularly, the present invention relates to a system, apparatus and subsystems for simulating vascular-access procedures.

BACKGROUND OF THE INVENTION

Medical practitioners, such as military medics, civilian emergency-medical personnel, nurses, and physicians, routinely perform vascular-access procedures (e.g., IV insertion, central venous-line placement, peripherally-inserted central catheter, etc). It is desirable for a practitioner to be proficient at performing these procedures since the proficient practitioner is far less likely to injure a patient and is almost certain to reduce the patient's level of discomfort.

Becoming proficient in vascular-access procedures requires practice. In fact, the certification and re-certification requirements of some states mandate a minimal number of needle sticks, etc., per year per provider. Historically, medical practitioners practiced needle-based procedures on live volunteers. More recently, simulation techniques and devices have been developed to provide training in vascular-access procedures without the use of live volunteers. U.S. Pat. No. 6,470,302 ("the '302 patent") surveys the art of medical-simulation devices and also discloses a vascular-access simulation system.

The vascular-access simulation system that is disclosed in the '302 patent includes an "interface" device and a computer system. To practice a vascular-access procedure, a user manipulates an "instrument," referred to in the patent as a "catheter unit assembly," which extends from the device and serves as a catheter-needle. Potentiometers and encoders within the interface device track the motion and position of the instrument and relay this information to the computer system. The computer system performs a simulation of the surface and subsurface anatomy of human skin, and determines the effect of the instrument's motion on the skin's anatomy. Simulated results are displayed by the computer system. Using the motion information from the interface device, the computer system also generates a control signal that controls a force-feedback system that is coupled to the instrument. The force-feedback system generates various resistive or reactive forces that are intended to simulate the forces that are experienced by a medical practitioner during an actual vascular-access procedure. The user senses these forces during manipulation of the instrument.

The simulation system that is disclosed in the '302 patent has many shortcomings that substantially limit its utility as a training or accreditation tool. One shortcoming of that simulation system relates to ergonomics.

In particular, when manipulating the catheter-unit assembly of that system, a user's hands are in an awkward and unrealistic position (as compared to the position of the hands during an actual vascular access procedure). This is due, among other reasons, to the height of the interface device, which is a consequence of the layout and design of the mechanisms that compose the interface device.

Furthermore, the relative positioning and arrangement of mechanisms with which a user of that system interacts to practice a vascular access procedure is not ergonomic. Specifically, the simulation system enables a user to perform needle "insertion" as well as a "skin-stretch" technique. The skin stretch normally accompanies catheter insertion during an actual procedure to reduce a patient's level of discomfort and to anchor the vein that is being entered.

In the system that is disclosed in the '302 patent, the skin-stretch mechanism, which includes a belt—a mock skin—, resides within a casing that is attached to and separate from the housing in which the needle-insertion procedure is practiced. To simulate the skin-stretch technique, a user "stretches" the mock skin. In comparison with an actual procedure, the location at which a user stretches the mock skin is rather remote from the needle "insertion point." Furthermore, the surface of the mock skin is not co-planar with or at the same height as the needle insertion point. In an actual procedure, of course, they are (i.e., the skin surface is the insertion point). This structural arrangement does nothing to promote a user's "suspension of disbelief" and does not provide a particularly realistic simulation.

The inability of prior-art vascular-access simulation systems to realistically simulate a vascular-access procedure limits their usefulness as a training or accreditation tool.

SUMMARY

The illustrative embodiment of the present invention is a simulation system that provides realistic training and practice for performing vascular-access procedures without using human subjects. Unlike some other prior-art simulation systems, the system is designed to provide ergonomically-correct hand position.

The illustrative embodiment of a vascular-access simulator includes a data-processing system and an interface device, referred to herein as a "haptics device." The haptics device provides the physical interface for performing vascular-access procedures. Some embodiments of the haptics device also provides mechanisms that enable a user to practice certain skin-interaction procedures (i.e., palpation, occlusion and skin stretch).

In accordance with the illustrative embodiment, the various mechanisms within the haptics device are configured so that one or more of the following conditions are met:
  The profile of the haptics device remains relatively low—advantageously not substantially higher than a person's arm when it is resting flat on a surface.
  The shape of the haptics device is not overtly inconsistent with human anatomy (e.g., an arm, etc.).
  When practicing a vascular-access procedure using the haptics device, the position of a user's hands is similar to the position of the hands when performing an actual vascular-access procedure.
  The sites at which the palpation and skin stretch techniques are performed are correct relative to one another (in terms of the sites of these techniques during an actual vascular-access procedure).
  The sites at which the occlusion and skin stretch techniques are performed are correct relative to one another (in terms of the sites of these techniques during an actual vascular-access procedure).
  The sites at which the occlusion and skin stretch techniques are performed are correct relative to the site at which the catheter/needle is inserted into the haptics device (in terms of the sites of these techniques during an actual vascular-access procedure).

The various mechanisms of the haptics device are beneath the "skin" of the haptics device.

Simulators described herein therefore more closely simulate a real vascular-access procedure than simulators in the prior art. This more realistic simulation is expected to result in a more useful training experience.

DETAILED DESCRIPTION

The terms and phrases listed below are defined for use in this specification as follows:

"End Effector" means a device, tool or instrument for performing a task. The structure of an end effector depends on the intended task. For example, in the illustrative embodiment, the end effector is intended to be used to simulate a vascular access procedure, and is therefore implemented as a catheter-needle module. Those skilled in the art will recognize that term "end effector" is borrowed from robotics, where it has a somewhat different definition: a device or tool connected to the end of a robot arm.

"Imitation" means an artificial likeness that is intended to be substantially similar to an item being imitated; a copy. For example, "imitation skin," which is used in conjunction with the illustrative embodiment of the present invention, is intended to mimic or copy genuine skin via appropriate selection of color, appearance, feel, and overall presentation.

"Mock" means "representative;" a stand-in for a genuine article, but not intended to closely imitate the genuine article. A mock article will never be confused with the genuine article and typically does not promote a suspension of disbelief that the mock article is the genuine article. For example, "mock skin" is not intended to mimic genuine skin, and typically departs from it in terms of color, appearance, feel or overall presentation.

"Pseudo" is an inclusive term that means "imitation" or "mock." For example, pseudo skin is meant to encompass both imitation skin and mock skin.

"Skin" means genuine skin.

Additional definitions are provided later in this Detailed Description.

This Detailed Description continues with an overview of a vascular-access simulator in accordance with the illustrative embodiment. Following the overview, specific embodiments of certain features of the simulator are described in greater detail.

Overview

Figure 1:
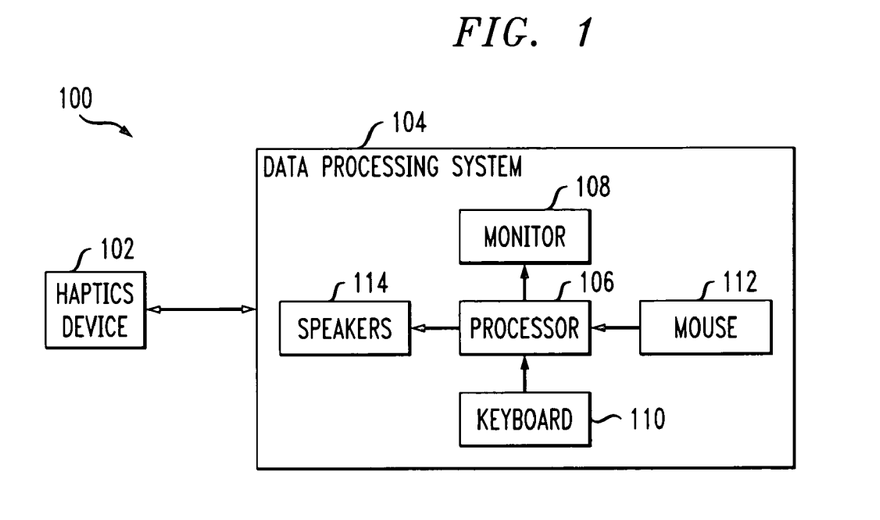
FIG. 1 depicts vascular-access simulation system 100 in accordance with the illustrative embodiment of the present invention.

The illustrative embodiment of the present invention pertains to a simulation system that provides realistic training and practice for vascular-access procedures without using human subjects. As depicted in FIG. 1, vascular-access simulator 100 includes haptics device 102 and data-processing system 104.

Haptics device 102 provides the physical interface for performing any of several simulated vascular-access procedures (e.g., intravenous catherization, central venous line placement, sternal intraosseous insertion, etc.).

The term "haptics" (as in "haptics device 102") relates to touch (i.e., the sense of touch). A fundamental function of haptics device 102, and indeed any haptics interface, is to create a means for communication between users (i.e., humans) and machines. This "communication" is possible since humans are capable of "mechanically" interfacing with their surroundings due, at least in part, to a sense of touch. This "sense of touch" includes sensations of pressure, texture, puncture, thermal properties, softness, wetness, friction-induced phenomena, adhesions, etc. Furthermore, humans also experience vibro-tactile sensations, which include the perception of oscillating objects in contact with the skin and kinesthetic perceptions (i.e., awareness of one's body state, including position, velocity, and forces supplied by the muscles). As will become clear later in this Detailed Description, our ability to perceive a variety of these sensations is exploited by haptics device 102.

To the extent that some embodiments of simulator 100 are intended for use as a practice and training tool, it is advantageous for haptics device 102 to simulate vascular-access procedures as realistically as possible and provide a quantitative measure of the user's performance of the simulated procedure. To this end, haptics device 102 possesses one or more of the following attributes, in addition to any others:

It possesses sufficient degrees-of-freedom to simulate the relatively free movement of a needle/catheter during an actual vascular-access procedure.

It offers the opportunity to perform all steps of a vascular-access procedure, including, for example, needle insertion, skin interactions (e.g., palpation, skin stretch, etc.), catheter threading, etc.

It generates appropriate skin- and venous-puncture forces.

It measures or otherwise quantifies the effects of user actions on simulated anatomy.

It generates appropriate haptic feedback (i.e., feel) during skin-interaction steps.

It is configured to provide ergonomically-correct hand position during simulated vascular-access procedures.

It is small enough so that it can be positioned in front of a computer monitor so that the haptics device and the monitor are inline with a user's forward-looking field of view.

It is at least subtly suggestive of human anatomy and does not present any substantial departures therefrom so as to support a user's ability to suspend disbelief during a simulated vascular-access procedure.

Data-processing system 104, which includes processor 106, monitor 108, keyboard 110, mouse 112, and speakers 114, supports the visual aspects of the simulation and other functions described below. Processor 106 is a general-purpose processor that is capable of receiving and processing signals from haptics device 102, running software for the visual portion of the vascular-access simulation including an anatomy simulator, running calibration software for calibrating the various sensing elements used in haptics device 102, and sending control signals to haptics device 102 to support closed-loop force feedback, among other capabilities. Processor 106 comprises memory, in which the software described above is stored. In the illustrative embodiment, processor 106 is a personal computer.

Monitor 108 displays a rendering that is generated by processor 106, in conjunction with the above-referenced software. The rendering, which in some embodiments is three-dimensional, is of a region of the body (e.g., isolated arm, thorax, neck, etc.) on which a simulated vascular-access procedure is being performed. The rendering advantageously depicts visual aspects such as, without limitation, the anatomical structures that underlie skin, local deformation of the skin in response to simulated contact, and tracking of a "virtual" instrument (e.g., a needle, etc.) through anatomical structures that underlie the skin.

Figure 2:
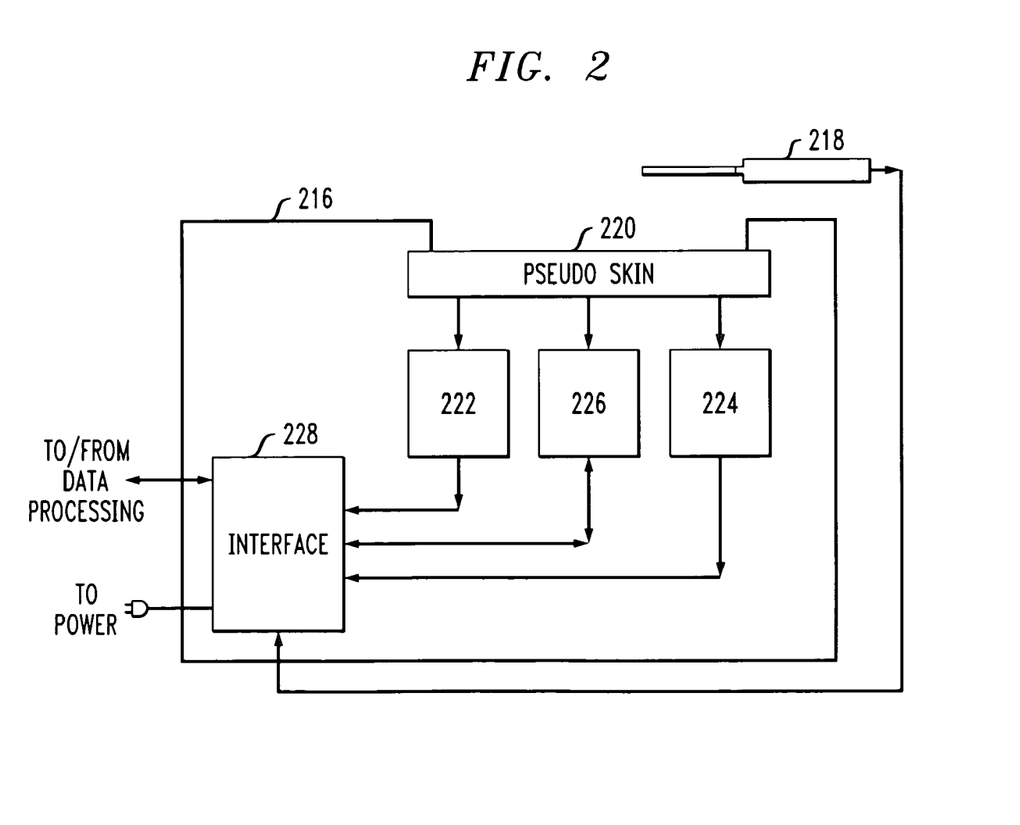
FIG. 2 depicts functional elements of haptics device 102, which is a part of vascular-access simulation system 100.

Haptics device 102 is now described in further detail. For pedagogical purposes, haptics device 102 is depicted in FIG. 2 as comprising several functional modules or elements. These include:

End effector or Needle/catheter module 218;
Pseudo skin 220;
Palpation module 222;
Skin-stretch module 224;
Receiver or Needle-stick module 226; and
Electronics/communications interface 228.

The functional elements of haptics device 102 listed above that relate to human anatomical features or are otherwise intended to generate resistive forces that would be sensed when penetrating such anatomical features (elements 222-228) are advantageously contained within housing 216 or otherwise located "underneath" pseudo skin 220. In an actual vascular-access procedure, the needle or catheter, of course, remains outside of the body until inserted during the procedure. Likewise, in accordance with the illustrative embodiment, the end effector—needle/catheter module 218—remains outside of housing 216 and pseudo skin 220 until a portion of it is inserted during a simulated vascular-access procedure.

Pseudo skin 220 is a membrane that is used in conjunction with the simulation of skin-interaction techniques, such as palpation, occlusion, and skin stretch techniques. Pseudo skin 220 is advantageously, but not necessarily, imitation skin (i.e., skin-like in appearance). In embodiments in which pseudo skin 220 is imitation skin, it possesses any one of a number of natural flesh tones. In some embodiments, pseudo skin 220 is at least somewhat resilient to enable a user to perform skin-interaction techniques. In some embodiments, pseudo skin 220 comprises a thermoplastic elastomer such as Cawiton®, which is available from Wittenburg, B.V., Hoevelaken, Netherlands. The use of imitation skin, as opposed to mock skin, is desirable because it helps a user to "suspend disbelief," which contributes to making simulator 100 more useful as a training tool.

Figure 3:
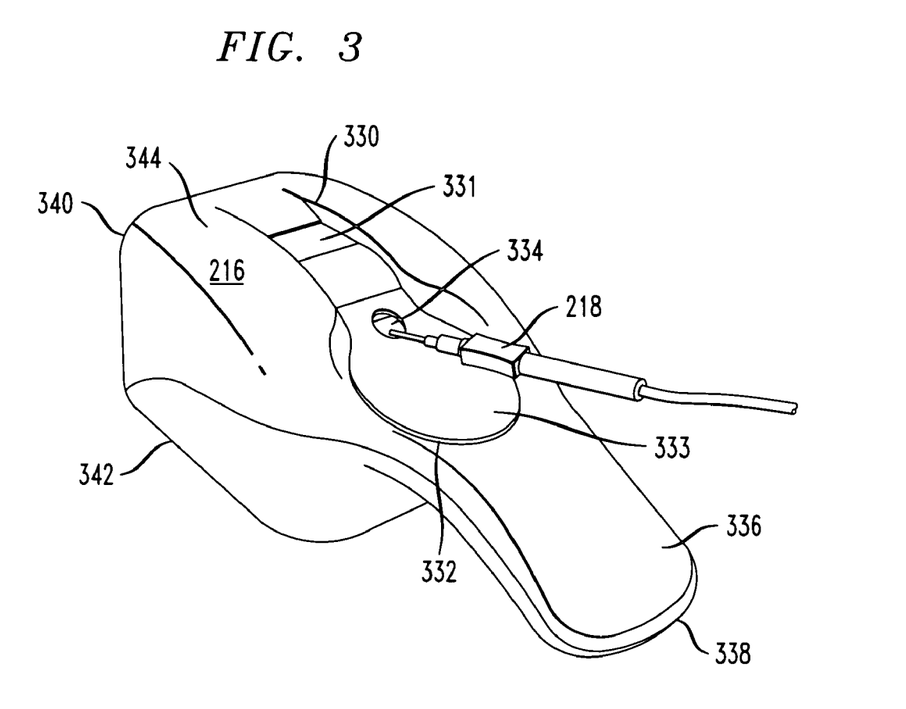
FIG. 3 depicts a perspective view of haptics device 102.

As depicted in FIG. 3, pseudo skin 220 is accessed for insertion and skin-interaction techniques (e.g., palpation, occlusion, skin stretch, etc.) through openings 330 and 332 in housing 216. Opening 330 defines palpation/occlusion region 331 (i.e., the site at which palpation and occlusion techniques are performed) and opening 332 defines skin-stretch region 333 (i.e., the site at which the skin-stretch technique is performed) and includes insertion region 334 for the end effector (e.g., needle/catheter module 218).

The ability to perform skin-interaction techniques provides a more realistic simulation of vascular-access procedures. In some embodiments, this ability is provided in conjunction with palpation module 222 and skin-stretch module 224. These modules, and illustrative embodiments thereof, are described in further detail applicant's co-pending U.S. patent application Ser. No. 10/807,017.

Pseudo skin 220 is disposed adjacent to the inside surface of housing 216 so that it appears to be nearly co-extensive (i.e., co-planar) with housing 216 at openings 330 and 332. This is intended to create a subtle suggestion that the surface of housing 216 is "skin" at regions other than where pseudo-skin 220 is accessed for skin-interaction techniques. Consistent with human anatomy, the remaining functional elements of haptics device 102 (elements 222-228), with the exception of needle/catheter module 218, are "hidden" beneath pseudo skin 220.

The end effector (e.g., needle/catheter module 218, etc.) is inserted into haptics device 102 at insertion region 334 at opening 332. During insertion, a user holds handle 336 as desired. In some embodiments, simulator 100 is capable of sensing orientation of the end effector, such as to determine the direction the bevel of a needle or catheter. This is an important aspect of the real insertion technique, since proper bevel orientation reduces a patient's discomfort during needle/catheter insertion. In some embodiments, needle/catheter module 218 is configured to be very similar to a real needle and catheter.

Once inserted into haptics device 102, the tip of needle/catheter module 218 engages receiver 226, which, for the illustrative embodiment of a vascular access simulator, is referred to as a "needle-stick module." Needle-stick module 226 supports the continued "insertion" of the needle/catheter module 218. In particular, in some embodiments, needle-stick module 226 is configured to provide one linear degree of freedom and two rotational degrees of freedom (i.e., pitch and yaw). The linear degree of freedom provides a variable insertion depth, enabling a user to advance needle/catheter module 218 into the "patient's arm" or other body part (i.e., haptics device 102). The rotational degrees of freedom enable a user to move (an engaged) needle/catheter module 218 up or down and left or right. In some embodiments, needle-stick module 226 measures insertion depth, and pitch (up/down) and yaw (left/right) angles.

In some embodiments, needle-stick module 226 provides "force feedback" to a user, whereby the user senses a variable resistance during continued advance (insertion) of needle-stick module 218. The resistance is intended to simulate penetration of the skin, a vein, and harder structures such as ligaments, bones, and the like. The resistance advantageously varies with insertion depth and the pitch and yaw of needle/catheter module 218, as described further below.

It will be understood that the "measurements" of angle, position, etc. that are obtained by the functional elements described above are obtained in conjunction with various sensors and data-processing system 104. In particular, most of the functional elements described above include one or more sensors. The sensors obtain readings from an associated functional element, wherein the readings are indicative of the rotation, displacement, etc., of some portion of the functional element. These readings provide, therefore, information concerning the manipulation of needle/catheter module 218 in addition to any other parameters.

Each sensor generates a signal that is indicative of the reading, and transmits the signal to electronics/communications interface 228. Sensors used in some embodiments include, without limitation, potentiometers, encoders, and MEMS devices. Those skilled in the art will know how to use and appropriately select sensors as a function of their intended use in conjunction with the functional elements described above.

Electronics/communications interface 228 receives the signals transmitted by the various functional elements of haptics device 102 and transmits them to data-processing system 104. In some embodiments, as an alternative to transmitting the received signals, electronics/communications interface 228 generates new signal(s) based on the received signals, and transmits the new signals to data-processing system 104. This latter approach requires a substantial increase in processing power and data management (relative to simply transmitting the received signals) and is generally a less-preferred approach. As described later below, electronics/communications interface 228 also receives signals from data processing system 104 and transmits them to needle-stick module 226 as part of a closed loop force-feedback system. Furthermore, electronics/communications interface 228 distributes power to the various functional modules, as required.

Data-processing system 104 receives the measurement data and, using the simulation software, calculates the forces that are being applied by the user during the skin-interaction procedures. Furthermore, using an anatomical model, data-processing system 104 calculates the position and angle of a virtual needle within a simulated anatomy (e.g., arm, etc.). Data-processing system 104 displays, on monitor 108, a rendering of the appropriate anatomy (e.g., arm, etc.) and displays and tracks the course of a virtual needle within this anatomy.

Furthermore, based on the position and course of the virtual needle (as calculated based on the position and orientation of needle/catheter module 218), data-processing system 104 generates control signals that are transmitted to needle-stick module 226. These control signals vary the resistive force presented by needle-stick module 226 to account for various anatomical structures (e.g., vein, tissue, tendons, bone, etc.) that needle/catheter module 218 encounters, based on the simulation. As a consequence, the resistance to continued needle/catheter insertion that is experienced by a user of simulator 100 is consistent with the resistance that would be sensed by a practitioner during an actual vascular access procedure.

In the illustrative embodiment, the functional modules described above are realized as independent, stand-alone mechanisms. In some other embodiments, the functions represented by two or more of these functional modules are combined into an integrated mechanism.

Having completed the overview of vascular-access simulator 100 and haptics device 102, the orientation of the various modules relative to one another and their position within housing 216 and relative to pseudo skin 220 will be described in further detail below.

It is the inventors' belief that, to the extent a user's interaction with haptics device 102 more closely tracks a practitioner's experience of performing the actual procedure (that the device is designed to simulate), the training experience is more useful. In this regard, the utility of a device such as haptics device 102 is enhanced by a design that is heavily influenced by form-function considerations and ergonomics. And, to that end, the illustrative embodiment of haptics device 102 has been strongly influenced by such considerations. In particular, and as described more fully below, considerations such as the positions of the functional modules (e.g., modules 222, 224, 226, etc.) relative to one another and relative to pseudo skin 220, as well as the shape and dimensions of housing 216 have been taken into account in the design of haptics device 102.

Referring now to FIG. 3, housing 216 is defined to have anterior end 338, posterior end 340, lower surface 342, and upper surface 344. Lower surface 342 typically is disposed on a working surface (e.g., table, etc.). In the illustrative embodiment, user interactions with haptics device 102 occur near upper surface 344 of housing 216. In some embodiments, housing 216 is subtly shaped like a portion of a human arm, yet is nondescript enough to avoid creating a discontinuity between what is seen and what is felt.

Pseudo skin 220 is accessible through openings 330 and 332 to perform simulated skin interaction techniques and needle/catheter insertion. In the illustrative embodiment, pseudo skin 220 is disposed adjacent to the inside surface of housing 216 so that it appears to be nearly co-extensive (i.e., co-planar) with housing 216 at openings 330 and 332. This is intended to create a subtle suggestion that the surface of housing 216 is "skin" at regions other than where pseudo-skin 220 is accessed. Consistent with human anatomy, the remaining functional elements of haptics device 102 (elements 222-228), with the exception of needle/catheter module 218, are "hidden" beneath pseudo skin 220. In some other embodiments, pseudo skin 220 is simply positioned across openings 330 and 332, and in yet some additional embodiments, the pseudo skin is disposed above the openings.

Skin-stretch region 333, which is accessible through opening 332, is proximal to anterior end 338 of housing 216 (relative to palpation/occlusion region 331). Palpation/occlusion region 331, which is accessible through opening 330, is proximal to posterior end 340 of housing 216 (relative to skin-stretch region 333). Insertion region 334, which is accessible through opening 330, is flanked by skin-stretch region 333 toward the anterior end and palpation/occlusion region 331 toward the posterior end. The relative positions at which a user interacts with haptics device 102 to practice these techniques is consistent with their relative positions during an actual vascular-access procedure. That is, a practitioner, sitting in front of a patient, would stretch the patient's skin and then insert the needle/catheter into the skin "behind" (from the practitioner's perspective) the stretch site. Likewise, the occlusion procedure would normally occur "behind" the insertion point. The site at which a practitioner palpates a patient's arm is typically coincident with the insertion point. In the illustrative embodiment of haptics device 102, a user "palpates" pseudo skin 220 "behind" insertion region 334.

Figure 4:
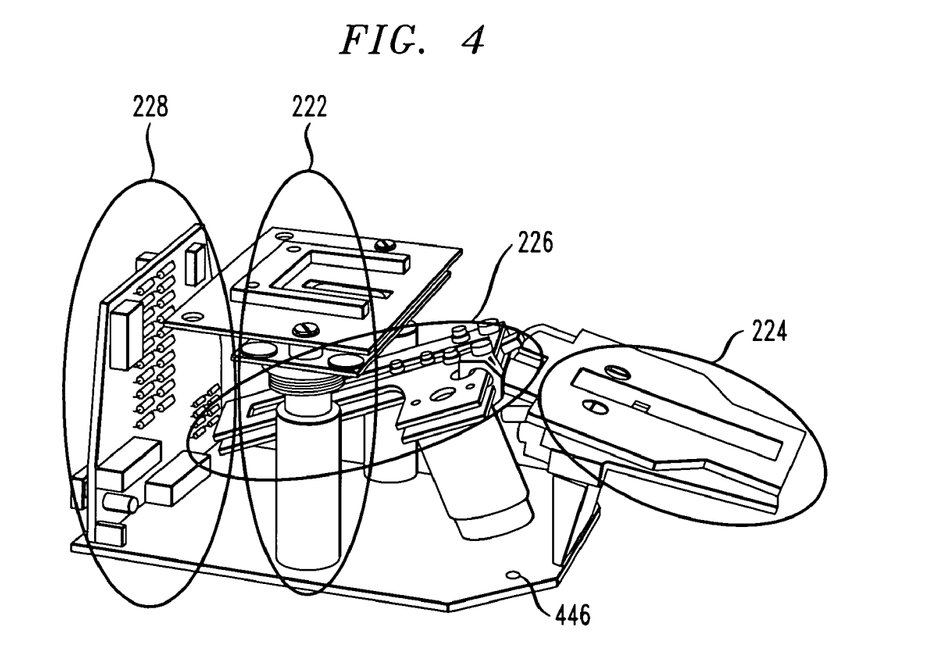
FIG. 4 depicts a perspective view of an illustrative embodiment of an arrangement of various functional modules of haptics device 102.
Figure 5:
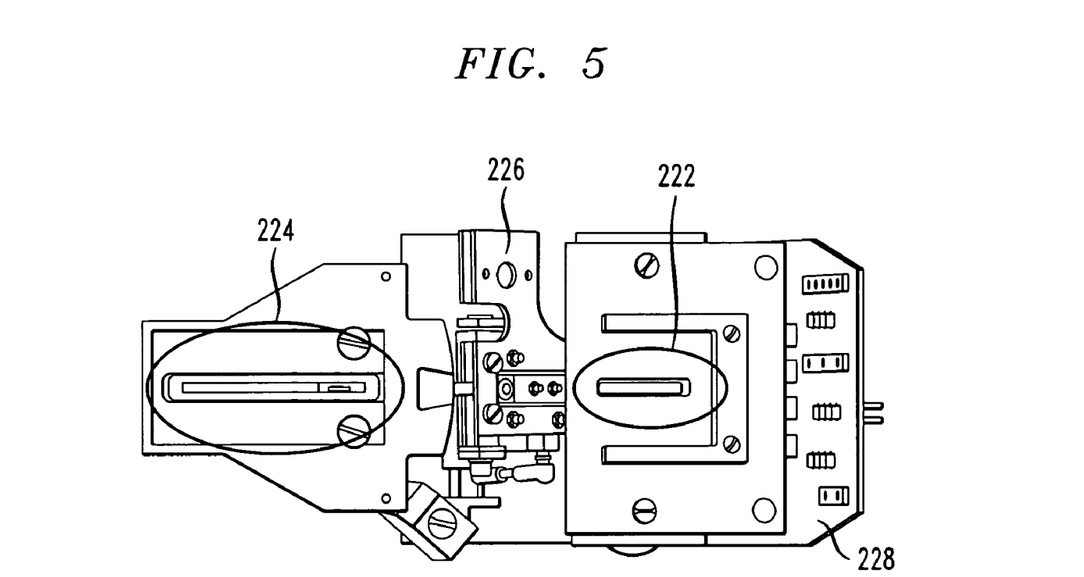
FIG. 5 depicts a top view of the arrangement of FIG. 4.
Figure 6:
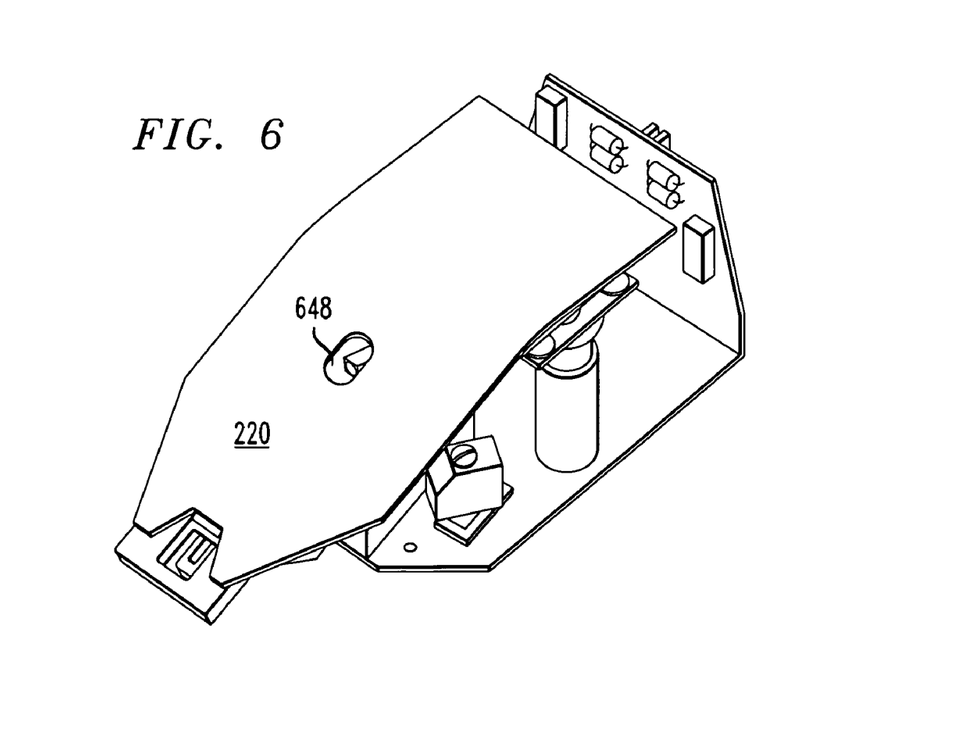
FIG. 6 depicts pseudo skin 220 overlying the arrangement of functional modules of haptics device 102.
Figure 7:
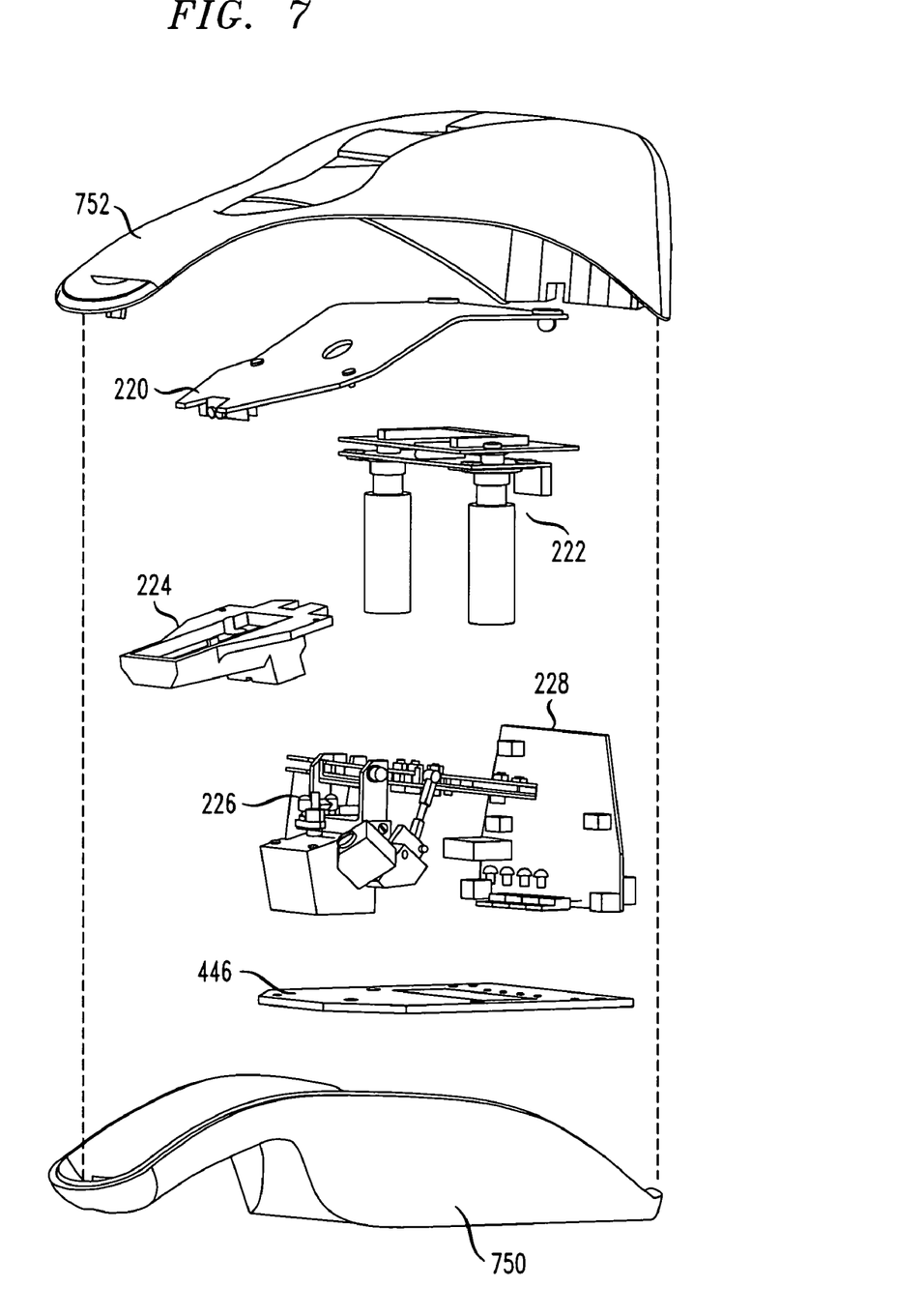
FIG. 7 depicts an exploded view of haptics device 102.
Figure 8:
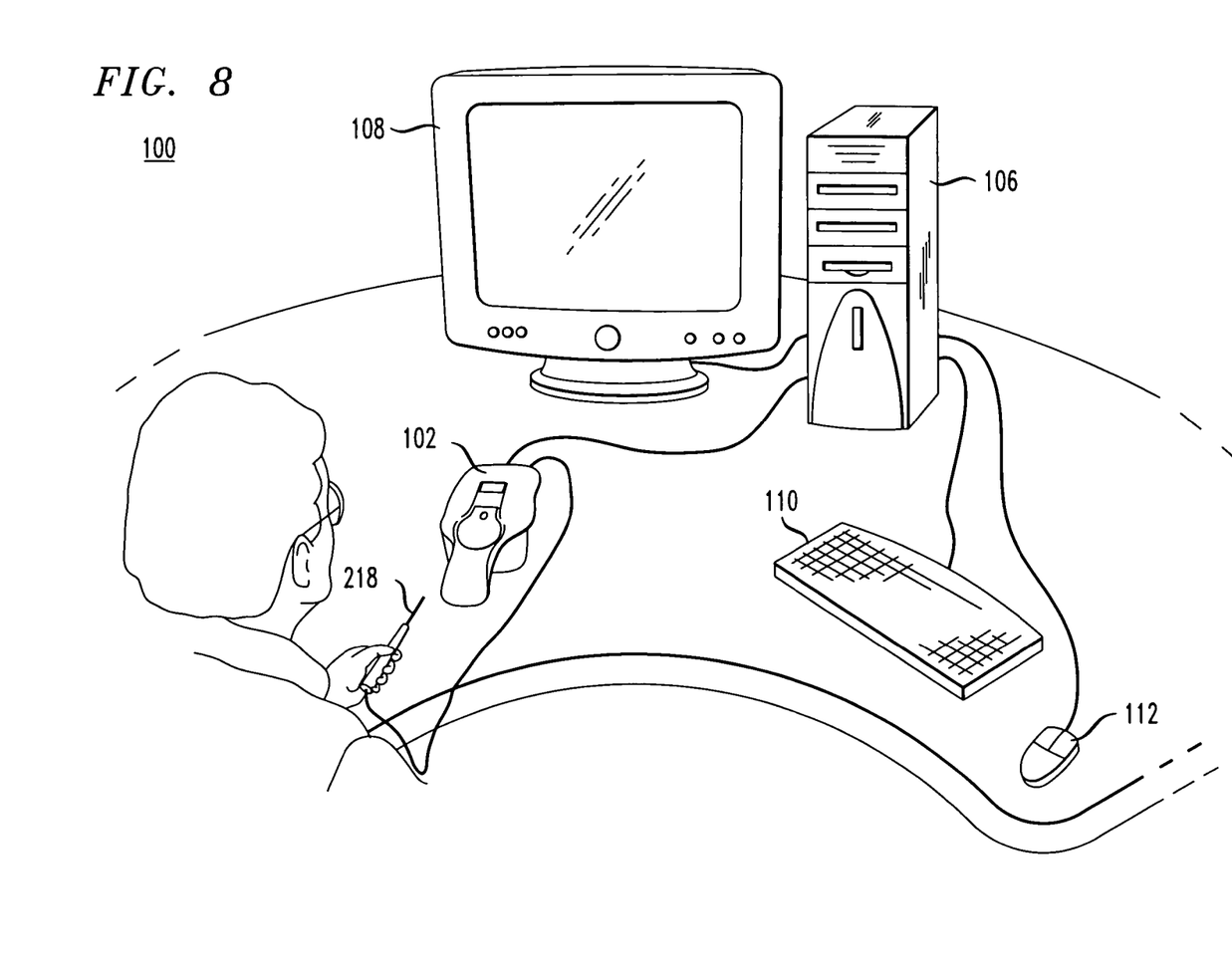
FIG. 8 depicts vascular-access simulation system 100 wherein haptics device 102 is positioned directly in front of monitor 108.

FIG. 4 depicts a perspective view of an embodiment of some of the functional modules of haptics device 102 and their relative positions within housing 216. Depicted in this Figure are skin-stretch module 224, receiver or needle-stick module 226, palpation module 222, and electronics/communications interface 228. FIG. 5 depicts a top view of these functional modules, FIG. 6 depicts pseudo skin 220 overlying the various functional modules, and FIG. 7 depicts an exploded view showing the various functional modules, pseudo skin 220 and upper and lower portions of housing 216. FIG. 8 depicts haptics device 102 in use in conjunction with data processing system 104.

Referring now to FIGS. 4 and 5, skin-stretch module 224, receiver or needle-stick module 226, palpation module 222, and electronics/communications interface 228 are engaged to base 446. The modules that are depicted in FIG. 4 would be oriented within housing 216 (not depicted in FIG. 4) such that skin-stretch module 224 is proximal to anterior end 338 of housing 216 and electronics/communications interface 228 is proximal to posterior end 340 of housing 216. The electrical interconnections between electronics/communications interface 228 and the other functional modules, as described earlier in this specification, can be seen in FIGS. 4 and 5.

The relative position of specific functional modules within housing 216 is consistent with the sites at upper surface 344 at which a user accesses those functions. In particular, skin-stretch module 224 is proximal to anterior end 338 of the housing relative to palpation module 222 and relative to at least the portion of receiver module 226 that receives needle/catheter module 218. Likewise, palpation module 222 is proximal to posterior end 340 of the housing relative to skin-stretch module 224 and relative to the portion of receiver module 226 that receives needle/catheter module 218. The portion of receiver module 226 that receives needle/catheter module 218 is flanked by skin-stretch module 224 toward anterior end 338 and by palpation module 222 toward posterior end 340.

In the illustrative embodiment, a portion of receiver module 226 is disposed in an open region between standoffs of palpation module 222. If receiver module 226 were not disposed in this region, then either the length or the height of housing 216 would have to be increased. It is undesirable to increase the length because doing so would further separate the sites at upper surface 344 at which a user practices the various techniques. In particular, the palpation site would be rather remote from the needle insertion point. In an actual vascular-access procedure, these sites, of course, are virtually coincident. It is undesirable to increase the height of the housing because, if placed in front of a monitor on which the visual portion of the simulation is being displayed, the housing will obscure the view. Furthermore, the greater height can force the hands into an unrealistic position in terms of the procedure being practiced.

This design constraint biased the design of palpation module 222 toward one in which standoffs are used to elevate the palpation module to recover space that might otherwise be lost. And this prompted the use of two actuating devices, rather than one, as could have otherwise been used.

Electronics/communications interface 228 is vertically oriented such that its major surface is oriented orthogonal to the uppermost surface of palpation module 222. It is advantageous to orient interface 228 in this manner since it reduces the length of housing 216 (as compared to orienting the interface with its major surface parallel to the uppermost surface of palpation module 222). And orienting interface 228 in this manner does not affect the height of housing 216 since, in this orientation, the interface is no higher than the uppermost surface of palpation module 222.

Arranging the functional modules as described above; that is, in a generally horizontal arrangement rather than in a vertical arrangement, enables the use of a relatively low-profile housing for haptics unit 102. This is desirable because it facilitates positioning housing 216 in front of a computer display without obscuring any portion of the screen, as is depicted in FIG. 8.

FIG. 8 depicts simulator 100, which comprises data processing system 104 (including processor 106, monitor 108, keyboard 110, mouse 112) and haptics device 102 (including housing 216 and the internal functional modules and end effector 218). As depicted in FIG. 8, haptics device 102 and monitor 108 are inline with a user's forward-looking field of view. This is desirable since a user looks to the monitor to view the visual portion of the simulation. (See, e.g., applicant's co-pending U.S. patent application Ser. No. 10/887,348). To the extent that the user interfaces with haptics device 102 at a location that is not directly in front of monitor 108, there is an inconsistency that does not promote a "suspension of disbelief" on the part of the user. To ensure that haptics device 102 does not obscure any portion of the screen, the functional modules are dimensioned and arranged so that the top of housing 216 advantageously has a height that is no more than about 5 inches, and more preferably has a height of about 4 inches or less.

As previously described, the various functional modules of haptics device 102, with the exception of needle/catheter module 218, are disposed beneath pseudo skin 220. This is, of course, consistent with the experience of performing a vascular access procedure. That is, the interactions occur at the skin. In the illustrative embodiment, the end effector (e.g., needle/catheter module 218, etc.) is inserted at insertion region 334 through opening 648 in pseudo skin 220. Furthermore, arranging the functional modules as described above, and beneath pseudo skin 220, results in the correct hand position for a user of haptics device 102, with reference to an actual vascular-access procedure.

FIG. 7 depicts an exploded view of haptics device 102 showing the relative positioning of the various functional modules within housing 216. In particular, FIG. 7 depicts lower portion 750 of housing 216, base 446, skin-stretch module 224, receiver module 226, palpation module 222, electronics/communications interface 228, pseudo skin 220, and upper portion 752 of housing 216.

It is to be understood that the above-described embodiments are merely illustrative of the present invention and that many variations of the above-described embodiments can be devised by those skilled in the art without departing from the scope of the invention. For example, in this specification, numerous specific details are provided in order provide a thorough description and understanding of the illustrative embodiments of the present invention. Those skilled in the art will recognize, however, that the invention can be practiced without one or more of those details, or with other methods, materials, components, etc.

Furthermore, in some instances, well-known structures, materials, or operations are not shown or described in detail to avoid obscuring aspects of the illustrative embodiments. It is understood that the various embodiments shown in the Figures are illustrative, and are not necessarily drawn to scale. Furthermore, the particular features, structures, materials, or characteristics can be combined in any suitable manner in one or more embodiments. It is therefore intended that such variations be included within the scope of the following claims and their equivalents.

We claim:

1. An apparatus comprising:
   pseudo skin;
   a receiver, wherein said receiver receives an end effector through an insertion region in said pseudo skin; and
   a first device for performing a first skin-interaction technique that is used in conjunction with a simulated vascular-access procedure, wherein the first skin-interaction technique is selected from the group consisting of palpation and occlusion and is performed on the pseudo skin at a first skin-interaction region of the pseudo skin, and further wherein:
   (a) said receiver and said first device are disposed beneath said pseudo skin and are covered by said pseudo skin; and
   (b) said insertion region of said pseudo skin is closer to a user than said first skin-interaction region of said pseudo skin when said user is using said apparatus.

2. The apparatus of claim 1 further comprising a second device for performing a second skin-interaction technique on the pseudo skin at a second skin-interaction region of the pseudo skin, wherein said second device is disposed beneath said pseudo skin and is covered by said pseudo skin.

3. The apparatus of claim 2 wherein:
   said second skin-interaction technique comprises skin stretching; and said second skin-interaction region of said pseudo skin is closer to a user than said insertion region of said pseudo skin when said user is using said apparatus.

4. The apparatus of claim 1 further comprising a housing, wherein:
   (a) said receiver and said first device are contained within said housing;
   (b) said pseudo skin is substantially co-extensive with a surface of said housing;
   (c) said housing has an anterior portion and a posterior portion;
   (d) in use, said anterior portion is proximal to a user; and
   (e) said posterior portion is distal to said user.

5. The apparatus of claim 4 wherein an uppermost surface of said housing is no more than about 5 inches above a lowermost surface thereof.

6. The apparatus of claim 4 further comprising a second device for performing a second skin-interaction technique on the pseudo skin at a second skin-interaction region of the pseudo skin, wherein said second device is disposed beneath said pseudo skin and is covered by said pseudo skin.

7. The apparatus of claim 6 wherein said second skin-interaction technique comprises skin-stretch.

8. The apparatus of claim 7 wherein at least some portion of said second device is closer to said anterior portion of said housing than said first device.

9. The apparatus of claim 7 wherein at least some portion of said second device is closer to said anterior portion of said housing than said first end of said receiver.

10. The apparatus of claim 7 wherein said first end of said receiver is closer to said anterior portion of said housing than said first device.

11. The apparatus of claim 7 wherein an upper-most surface of said first device extends a greater distance above a lowermost surface of said housing than said first end of said receiver.

12. The apparatus of claim 7 wherein an upper-most surface of said first device extends further above a lowermost surface of said housing than an upper-most surface of said second device.

13. The apparatus of claim 4 further comprising an electronics/communications interface, wherein:
   said electronics/communications interface receives signals from sensors that are associated with at least one of said first device or said receiver; and
   said electronics/communications interface is disposed beneath said pseudo skin and is covered by said pseudo skin.

14. The apparatus of claim 13 wherein said electronics/communications interface is closer to said posterior portion of said housing than said first device.

15. The apparatus of claim 13 wherein said electronics/communications interface is closer to said posterior portion of said housing than said receiver.

16. The apparatus of claim 13 wherein said electronics/communications interface comprises a printed circuit board, and further wherein a major surface of said printed circuit board is disposed orthogonal to an uppermost surface of said first device.

17. An apparatus comprising:
   a housing, wherein said housing has an opening in an uppermost surface thereof;
   pseudo skin, wherein said pseudo skin covers said opening;
   an end effector, wherein said end effector is inserted into said housing through said pseudo skin during the performance of a simulated vascular-access procedure; and
   a plurality of mechanisms, wherein said plurality of mechanisms are contained completely within said housing and are covered by said pseudo skin, and wherein said plurality of mechanisms include:
      (a) a first mechanism is for simulating a skin-stretch technique that is used in conjunction with a simulated vascular-access procedure and is performed on said pseudo skin; and
      (b) a second mechanism for receiving said end effector.

18. The apparatus of claim 17 wherein said mechanisms includes a third mechanism for simulating at least one of a palpation or an occlusion technique that is used in conjunction with a simulated vascular-access procedure and is performed on said pseudo skin, and wherein said end effector is at least one of either a needle or a catheter.

19. The apparatus of claim 18 wherein said housing has an anterior end and a posterior end, wherein in use, said anterior end is proximal to a user, and wherein a portion of said second mechanism is flanked by said first mechanism proximal to said anterior end and said third mechanism proximal to said posterior end.

20. The apparatus of claim 18 wherein:
   a user interacts with said first mechanism at a first site on said pseudo skin;
   said user interacts with said second mechanism at a second site on said pseudo skin;
   said user interacts with said third mechanism at a third site on said pseudo skin; and
   locations of each of said first site, second site, and third site on said pseudo skin correspond to locations of said first mechanism, second mechanism, and third mechanism, respectively, within said housing.

21. An apparatus comprising:
   a pseudo skin;
   a plurality of mechanisms with which a user interacts for simulating a vascular-access procedure, including at least one mechanism for performing a non-invasive skin-interaction technique that is performed on said pseudo skin, wherein said plurality of mechanisms are disposed under said pseudo skin and are covered by said pseudo skin; and
   a housing, wherein said housing contains said plurality of mechanisms.

22. The apparatus of claim 21 wherein said housing is no more than about 5 inches in height.

23. The apparatus of claim 21 wherein said housing is no more than about 4 inches in height.

24. The apparatus of claim 21 wherein at least one of either a needle or catheter is disposed outside of said housing until inserted therein during a simulated vascular-access procedure.

25. The apparatus of claim 21 further comprising a data processing system, wherein said data processing system receives signals from sensors that are associated with said plurality of mechanisms.

26. The apparatus of claim 21 wherein said plurality of mechanisms comprise discrete devices, wherein a first of said devices is for enabling a user to perform a skin-stretch technique, a second of said devices is for receiving a needle or catheter or both, and a third of said devices is for enabling a user to perform at least one of either a palpation technique or an occlusion technique.

* * * * *